United States Patent

Guest

[11] Patent Number: 5,848,618
[45] Date of Patent: Dec. 15, 1998

[54] RELATING TO COMPOSITE TUBING

[76] Inventor: John Derek Guest, 'Iona', Cannon Hill Way, Bray, Maidenhead, Berkshire SL6 2EX, United Kingdom

[21] Appl. No.: 800,547

[22] Filed: Feb. 18, 1997

[30] Foreign Application Priority Data

Feb. 23, 1996 [GB] United Kingdom .................. 9603827

[51] Int. Cl.[6] ..................................................... F16L 11/11
[52] U.S. Cl. ........................... 138/121; 138/137; 138/140; 138/141; 138/131
[58] Field of Search ..................... 138/137, 121, 138/141, DIG. 3, DIG. 8, 140, 131

[56] References Cited

U.S. PATENT DOCUMENTS

| 2,704,556 | 3/1955 | Blish | 138/DIG. 8 X |
|---|---|---|---|
| 2,998,028 | 8/1961 | Rohde | 138/DIG. 8 X |
| 3,032,357 | 5/1962 | Shames et al. | 138/DIG. 8 X |
| 3,814,138 | 6/1974 | Courtot | 138/137 X |
| 4,299,256 | 11/1981 | Bacehowski et al. | 138/137 |
| 4,565,351 | 1/1986 | Conti et al. | 254/134.3 FT |
| 4,779,651 | 10/1988 | Hegler et al. | 138/109 |
| 4,892,442 | 1/1990 | Shoffner | 138/141 X |
| 4,970,351 | 11/1990 | Kirlin | 138/137 X |
| 5,170,011 | 12/1992 | Martucci | 138/137 X |
| 5,431,191 | 7/1995 | Neuhauser et al. | 138/121 X |

*Primary Examiner*—Patrick F. Brinson
*Attorney, Agent, or Firm*—Baker & Daniels

[57] ABSTRACT

The disclosure relates to a composite tubing comprising a convoluted tubular core having coextruded inner and outer plastics layers providing a composite tube having a smooth inner bore and a smooth outer surface.

3 Claims, 1 Drawing Sheet

RELATING TO COMPOSITE TUBING

BACKGROUND TO THE INVENTION

1. FIELD OF THE INVENTION

This invention relates to composite tubing which can readily be bent to a required shape or profile.

2. BACKGROUND PRIOR ART

Various forms of convoluted tubing are known for different applications. In particular tubing is convoluted to allow for greater flexibility without kinking. In addition plastics tubing having appropriate inner and outer layers is known especially in applications where different characteristics are required for the inner and outer layers of the tube. See, for example, U.S. Pat. Specification Nos. 4,299,256, 4,565,351 and 4,892,442 and European Patent Specification No. 0326711.

SUMMARY OF THE INVENTION

This invention provides a composite tubing comprising a convoluted tubular core having coextruded inner and outer plastics layers providing a composite tube having a smooth inner bore and a smooth outer surface.

More specifically the tubular core may have circumferentially extending convolution spaced along its length.

Further, the core may be formed from a metal or plastics which takes a permanent set when bent so that bending the resulting composite tubing containing the core results in the tubing taking a permanent set.

In one arrangement according to the invention the convolutions encircling the tube may be of generally square profile having rounded inner and outer corners.

In one alternative construction the convolutions extend lengthwise of the tube.

DESCRIPTION OF THE PREFERRED EMBODIMENTS

Figure 1:
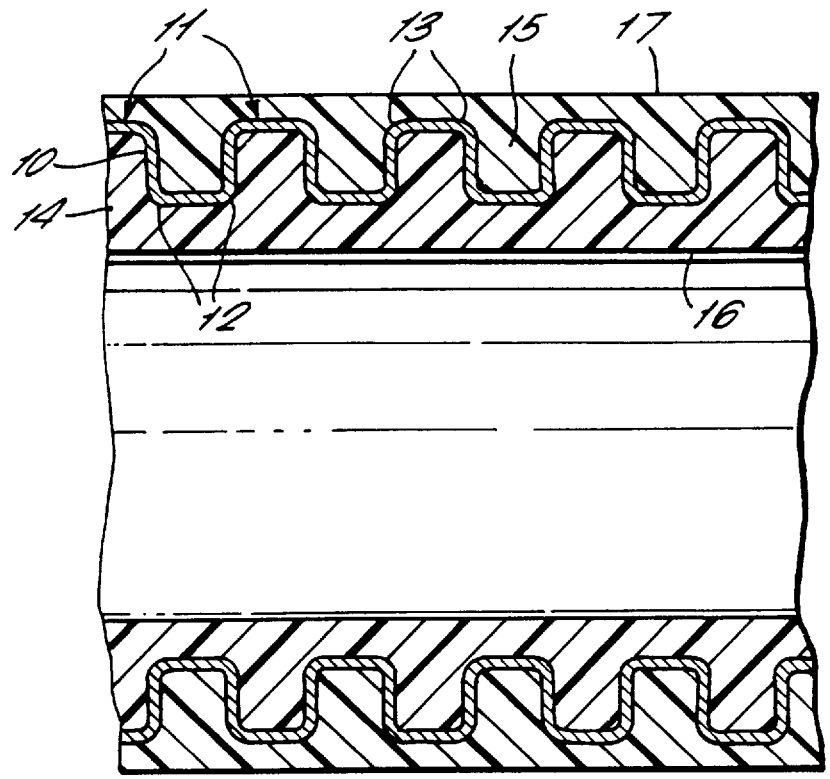
FIG. 1 is a cross-sectional view through a length of coextruded tube having inner and outer layers in accordance with the present invention.
Figure 2:
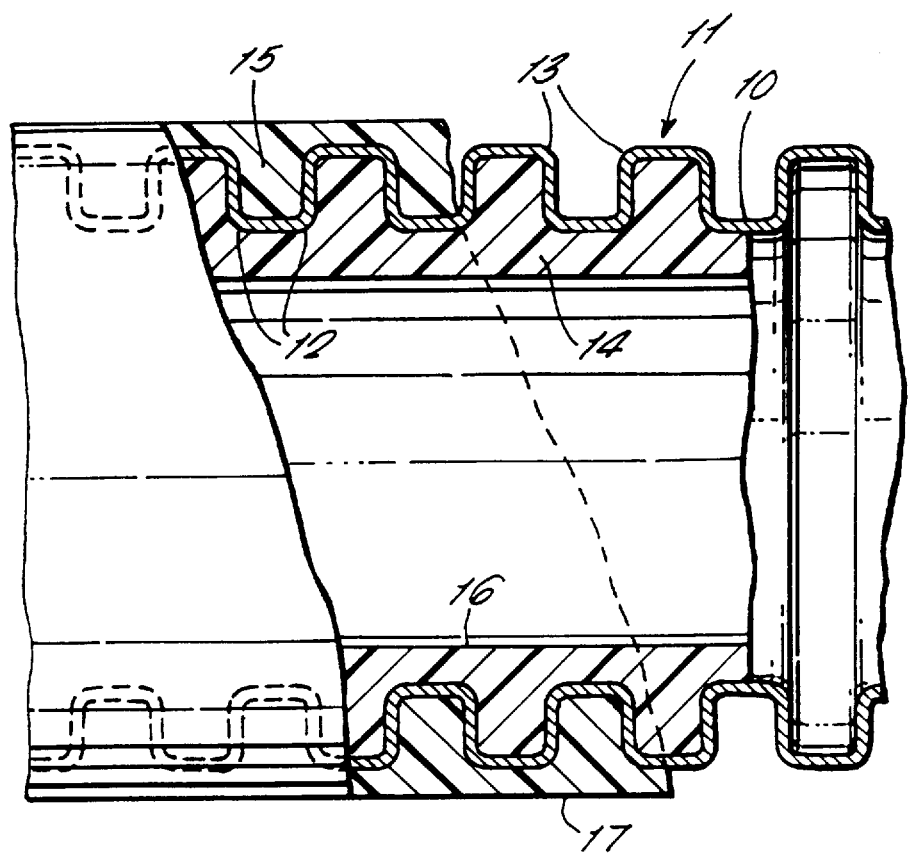
FIG. 2 is a cross-sectional view through the tubing of FIG. 1 with the inner layer cut away over part of the length and the outer layer cut away over the remainder.

Referring firstly to FIG. 1 of the drawings, there is shown a three part composite tube comprising an inner metal or polymeric core 10 formed with circumferential convolutions 11 at spaced locations throughout the length of the core. The convolutions are of a generally square form with rounded inner and outer corners indicated at 12 and 13 respectfully.

The core is coated on its inner and outer surfaces with layers of polymer material 14, 15 which are co-extruded onto the core in a single extruding operation to form a composite tube having a smooth inner bore 16 and a smooth outer surface 17.

The inner convoluted tubular core is relatively stiff in relation to the polymeric layers but when flexed, adopts a permanent set. Thus the composite tubing can be bent to a required radius or other shape and the inner core will hold the tubing in that shape.

It will be appreciated that the inner core may be formed with other forms of convolution and may even be convoluted lengthwise. Also it may be formed from polymeric materials of the required stiffness and flexibility.

Metal/plastic combination tubes already exist in certain applications. They offer a range of advantages: greater mechanical strength/stiffness; lower thermal expansion; constant stiffness over a working temperature range; reduced or eliminated permeations; and fire resistance. Also the metal layer overcomes the plastics "memory" and allows the tube to be more readily formed to the required shape.

Convoluted tubes in plastic and metal already exist. They offer greater flexibility without kinking, etc.

The present invention combines a convoluted tubular core with coextruded inner and outer layers of polymeric material applied to the core. The resulting composite tubing has the following advantages:

Convoluted tube but with smooth inside and outside diameters allowing conventional sealing, etc.

Plastic tube can be tailored by varying the internal convolution formed to have optimal mechanical properties in terms of stiffness but excessive use of material.

Convoluted layer allows tube to be easily cut (due to thinner metal) but reduces distortion of tube end due to flattening during cutting and use.

Convolution can also act as a guide to help ensure cut end of the tube is square with its axis.

Convoluted layer can also be made of plastics.

I claim:

1. A composite tubing comprising a convoluted tubular core formed from a flexible material which adopts a permanent set when deformed, said core having circumferential grooves alternately on the inner and outer sides of said core and having coextruded inner and outer plastics layers filling said grooves on said inner and outer sides of said core and providing a composite tube having a smooth inner bore and a smooth outer surface.

2. A composite tubing as claimed in claim 1, wherein the core is formed from one of a metal or and plastics which takes a permanent set when bent so that bending the resulting composite tubing containing the core results in the tubing taking a permanent set.

3. A composite tubing as claimed in claim 1, wherein the convolutions encircling the tube are of generally square profile having rounded inner and outer corners.

* * * * *